(12) United States Patent
Dhuse et al.

(10) Patent No.: US 12,411,736 B2
(45) Date of Patent: *Sep. 9, 2025

(54) DATA RECONSTRUCTION IN A STORAGE NETWORK AND METHODS FOR USE THEREWITH

(71) Applicant: Pure Storage, Inc., Santa Clara, CA (US)

(72) Inventors: Greg R. Dhuse, Chicago, IL (US); Vance T. Thornton, Columbus, OH (US); Jason K. Resch, Warwick, RI (US); Ilya Volvovski, Chicago, IL (US); Dustin M. Hendrickson, Chicago, IL (US); John Quigley, Chicago, IL (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,544

(22) Filed: Aug. 1, 2024

(65) Prior Publication Data

US 2024/0394146 A1 Nov. 28, 2024

Related U.S. Application Data

(63) Continuation of application No. 17/645,563, filed on Dec. 22, 2021, now Pat. No. 12,061,519, which is a (Continued)

(51) Int. Cl.
G06F 11/10 (2006.01)
G06F 11/07 (2006.01)
(Continued)

(52) U.S. Cl.
CPC ...... *G06F 11/1092* (2013.01); *G06F 11/0727* (2013.01); *G06F 11/141* (2013.01);
(Continued)

(58) Field of Classification Search
None
See application file for complete search history.

(56) References Cited

U.S. PATENT DOCUMENTS 4,092,732 A 5/1978 Ouchi
5,454,101 A 9/1995 Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Eliyah S. Harper
(74) *Attorney, Agent, or Firm* — Katz Ruby & Carle LLP; Katherine C. Stuckman; Bruce E. Stuckman

(57) ABSTRACT

A processor in a storage network operates by: receiving an access request for a data segment, wherein the data segment is encoded utilizing an error correcting information dispersal algorithm as a set of encoded data slices that are stored in a plurality of storage units of the storage network and wherein each encoded data slice of the set of encoded data slices includes a corresponding checksum of a plurality of checksums; retrieving, from the storage network, a subset of encoded data slices that includes a threshold number of encoded data slices of the set of encoded data slices; determining, based on ones of the plurality of checksums corresponding to the subset of encoded data slices, when the subset of encoded data slices includes at least one corrupted encoded data slice; retrieving from at least one of the plurality of storage units an addition number of encoded data slices required to generate a reconstructed data segment based on the subset of encoded data slices; generating the reconstructed data segment in accordance with the error correcting information dispersal algorithm, using the additional number of encoded data slices and at least some of the subset of encoded data slices; providing the reconstructed (Continued)

data segment in response to the access request; forming a reconstructed set of encoded data slices utilizing the error correcting information dispersal algorithm on the reconstructed data segment; and replacing the at least one corrupted encoded data slice with at least one reconstructed encoded data slice of the reconstructed set of encoded data slices.

20 Claims, 10 Drawing Sheets

Related U.S. Application Data continuation-in-part of application No. 16/988,135, filed on Aug. 7, 2020, now Pat. No. 11,416,339, which is a continuation of application No. 16/390,530, filed on Apr. 22, 2019, now Pat. No. 11,194,662, said application No. 17/645,563 is a continuation-in-part of application No. 16/149,667, filed on Oct. 2, 2018, now abandoned, which is a continuation-in-part of application No. 15/819,810, filed on Nov. 21, 2017, now Pat. No. 11,327,674, said application No. 16/390,530 is a continuation of application No. 14/447,890, filed on Jul. 31, 2014, now Pat. No. 10,360,180, said application No. 15/819,810 is a continuation-in-part of application No. 13/869,655, filed on Apr. 24, 2013, now Pat. No. 10,178,083, said application No. 14/447,890 is a continuation of application No. 13/154,725, filed on Jun. 7, 2011, now Pat. No. 10,289,688, and a continuation-in-part of application No. 12/749,592, filed on Mar. 30, 2010, now Pat. No. 8,938,591, which is a continuation-in-part of application No. 12/218,594, filed on Jul. 16, 2008, now Pat. No. 7,962,641, which is a continuation-in-part of application No. 12/218,200, filed on Jul. 14, 2008, now Pat. No. 8,209,363, and a continuation-in-part of application No. 12/080,042, filed on Mar. 31, 2008, now Pat. No. 8,880,799, and a continuation-in-part of application No. 11/973,613, filed on Oct. 9, 2007, now Pat. No. 8,285,878, and a continuation-in-part of application No. 11/973,621, filed on Oct. 9, 2007, now Pat. No. 7,904,475, and a continuation-in-part of application No. 11/973,622, filed on Oct. 9, 2007, now Pat. No. 8,171,101, and a continuation-in-part of application No. 11/973,542, filed on Oct. 9, 2007, now Pat. No. 9,996,413, and a continuation-in-part of application No. 11/403,684, filed on Apr. 13, 2006, now Pat. No. 7,574,570, and a continuation-in-part of application No. 11/403,391, filed on Apr. 13, 2006, now Pat. No. 7,546,427, and a continuation-in-part of application No. 11/404,071, filed on Apr. 13, 2006, now Pat. No. 7,574,579, and a continuation-in-part of application No. 11/241,555, filed on Sep. 30, 2005, now Pat. No. 7,953,937.

(60) Provisional application No. 61/655,736, filed on Jun. 5, 2012, provisional application No. 61/357,430, filed on Jun. 22, 2010, provisional application No. 61/237,624, filed on Aug. 27, 2009.

(51) Int. Cl.
| | | |
|---|---|---|
| *G06F 11/14* | (2006.01) | |
| *G06F 11/16* | (2006.01) | |
| *G06F 16/13* | (2019.01) | |
| *H04L 9/32* | (2006.01) | |
| *H04L 9/40* | (2022.01) | |
| *H04L 67/06* | (2022.01) | |
| *H04W 12/041* | (2021.01) | |
| *H04W 12/0431* | (2021.01) | |
| *H04W 12/30* | (2021.01) | |
| *G06F 21/31* | (2013.01) | |
| *G06F 21/62* | (2013.01) | |
| *H04L 67/1097* | (2022.01) | |
| *H04W 12/10* | (2021.01) | |

(52) U.S. Cl.
CPC ............ *G06F 11/167* (2013.01); *G06F 16/13* (2019.01); *H04L 9/3242* (2013.01); *H04L 9/3247* (2013.01); *H04L 9/3263* (2013.01); *H04L 9/3271* (2013.01); *H04L 63/06* (2013.01); *H04L 63/12* (2013.01); *H04L 67/06* (2013.01); *H04W 12/041* (2021.01); *H04W 12/0431* (2021.01); *H04W 12/35* (2021.01); *G06F 16/137* (2019.01); *G06F 21/31* (2013.01); *G06F 21/6209* (2013.01); *G06F 2211/1028* (2013.01); *H04L 63/0428* (2013.01); *H04L 67/1097* (2013.01); *H04L 2209/043* (2013.01); *H04L 2209/30* (2013.01); *H04L 2209/34* (2013.01); *H04L 2209/56* (2013.01); *H04L 2209/80* (2013.01); *H04W 12/10* (2013.01)

(56) References Cited

U.S. PATENT DOCUMENTS

| | | |
|---|---|---|
| 5,485,474 A | 1/1996 | Rabin |
| 5,584,008 A | 12/1996 | Shimada |
| 5,774,643 A | 6/1998 | Lubbers |
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Vilkov |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,836,432 B1 | 12/2004 | Parker |
| 6,879,596 B1 | 4/2005 | Dooply |
| 6,898,667 B2 | 5/2005 | Umberger |
| 6,978,366 B1 | 12/2005 | Ignatchenko |
| 7,000,143 B2 | 2/2006 | Moulton |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |

(56) References Cited

U.S. PATENT DOCUMENTS

| | | |
|---|---|---|
| 7,146,644 B2 | 12/2006 | Redlich |
| 7,171,493 B2 | 1/2007 | Shu |
| 7,222,133 B1 | 5/2007 | Raipurkar |
| 7,225,263 B1 | 5/2007 | Clymer |
| 7,240,236 B2 | 7/2007 | Cutts |
| 7,272,613 B2 | 9/2007 | Sim |
| 7,418,649 B2 | 8/2008 | Li |
| 7,457,835 B2 | 11/2008 | Toebes |
| 7,529,834 B1 * | 5/2009 | Birrell ................ G06F 11/1464 709/227 |
| 7,533,133 B1 | 5/2009 | Lanzatella |
| 7,574,570 B2 | 8/2009 | Gladwin et al. |
| 7,581,156 B2 | 8/2009 | Manasse |
| 7,607,063 B2 | 10/2009 | Kikuchi |
| 7,636,724 B2 | 12/2009 | De La Torre |
| 7,680,822 B1 | 3/2010 | Vyas |
| 7,681,104 B1 * | 3/2010 | Sim-Tang ............ H04L 1/0057 714/763 |
| 7,681,105 B1 * | 3/2010 | Sim-Tang ......... H03M 13/2909 714/763 |
| 7,743,275 B1 | 6/2010 | Tormasov |
| 7,831,793 B2 | 11/2010 | Chakravarty |
| 7,865,673 B2 | 1/2011 | Moore |
| 7,904,475 B2 | 3/2011 | Gladwin |
| 7,925,666 B1 | 4/2011 | Johnson |
| 7,945,639 B2 | 5/2011 | Gavrilov |
| 7,962,641 B1 | 6/2011 | Dhuse |
| 8,051,362 B2 | 11/2011 | Li |
| 8,145,818 B2 | 3/2012 | Murayama |
| 8,171,101 B2 | 5/2012 | Gladwin |
| 8,209,363 B2 | 6/2012 | Palthepu |
| 8,214,590 B2 | 7/2012 | Ulrich |
| 8,281,181 B2 | 10/2012 | Resch |
| 8,281,404 B2 | 10/2012 | Frey |
| 8,285,878 B2 | 10/2012 | Gladwin |
| 8,335,904 B1 | 12/2012 | Kitchen |
| 8,386,840 B2 | 2/2013 | Stougie |
| 8,406,421 B2 | 3/2013 | Kaymen |
| 8,429,514 B1 | 4/2013 | Goel |
| 8,433,849 B2 | 4/2013 | De Schrijver |
| 8,464,133 B2 | 6/2013 | Grube |
| 8,620,879 B2 | 12/2013 | Cairns |
| 8,694,467 B2 | 4/2014 | Sun |
| 8,713,405 B2 | 4/2014 | Healey |
| 8,856,530 B2 | 10/2014 | Patti |
| 8,862,837 B1 | 10/2014 | Marshak |
| 8,868,508 B2 | 10/2014 | Drobychev |
| 8,880,799 B2 | 11/2014 | Foster |
| 8,914,632 B1 | 12/2014 | Shankar |
| 8,918,478 B2 | 12/2014 | Ozzie |
| 8,935,493 B1 | 1/2015 | Dolan |
| 8,938,591 B2 * | 1/2015 | Mark .................... G06F 3/0619 711/155 |
| 8,972,694 B1 | 3/2015 | Dolan |
| 9,098,519 B2 * | 8/2015 | Pavlov .................. G06F 3/0619 |
| 9,235,350 B2 | 1/2016 | Mark |
| 9,305,069 B2 * | 4/2016 | Zunger .................... G06F 16/27 |
| 9,332,422 B2 * | 5/2016 | Bai .......... H04W 8/24 |
| 9,372,809 B2 * | 6/2016 | Testardi .................. G06F 3/065 |
| 9,792,295 B1 | 10/2017 | Rus |
| 9,811,262 B1 | 11/2017 | Rus |
| 9,996,413 B2 * | 6/2018 | Dhuse ................ G06F 11/1076 |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0065656 A1 | 4/2003 | de la Torre |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0055603 A1 | 3/2005 | Soran |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula, Jr. |
| 2005/0132070 A1 | 6/2005 | Redlich |
| 2005/0144382 A1 | 6/2005 | Schmisseur |
| 2005/0160329 A1 | 7/2005 | Briggs |
| 2005/0210270 A1 | 9/2005 | Rohatgi |
| 2005/0229069 A1 | 10/2005 | Hassner |
| 2006/0041719 A1 | 2/2006 | Chui |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2007/0030734 A1 | 2/2007 | Sinclair |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0113032 A1 | 5/2007 | Kameyama |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters, III |
| 2008/0183975 A1 * | 7/2008 | Foster ..................... G06F 11/08 711/E12.001 |
| 2008/0235234 A1 | 9/2008 | Beedubail |
| 2009/0037500 A1 | 2/2009 | Kirshenbaum |
| 2009/0094250 A1 * | 4/2009 | Dhuse ................. G06F 11/1076 |
| 2009/0094251 A1 | 4/2009 | Gladwin |
| 2009/0094318 A1 | 4/2009 | Gladwin |
| 2010/0023524 A1 * | 1/2010 | Gladwin ............... G06F 3/0659 711/E12.001 |
| 2010/0088464 A1 | 4/2010 | Yang |
| 2010/0138604 A1 | 6/2010 | Noguchi |
| 2010/0218037 A1 | 8/2010 | Swartz |
| 2010/0268692 A1 | 10/2010 | Resch |
| 2010/0299313 A1 | 11/2010 | Orsini |
| 2011/0029809 A1 * | 2/2011 | Dhuse ................. H04L 67/1097 714/6.1 |
| 2011/0029840 A1 | 2/2011 | Ozzie |
| 2011/0087948 A1 | 4/2011 | Murakami |
| 2011/0126060 A1 | 5/2011 | Grube |
| 2011/0225202 A1 | 9/2011 | Man |
| 2011/0289122 A1 | 11/2011 | Grube |
| 2012/0060072 A1 | 3/2012 | Simitci |
| 2012/0131683 A1 | 5/2012 | Nassar |
| 2013/0246470 A1 | 9/2013 | Price |
| 2013/0275844 A1 * | 10/2013 | Thornton ................ G06F 3/064 707/652 |
| 2015/0074216 A1 * | 3/2015 | Park .................... H04L 41/5025 709/208 |
| 2015/0355979 A1 * | 12/2015 | Volvovski ............. H04L 9/0897 707/675 |
| 2022/0114053 A1 * | 4/2022 | Dhuse ................ G06F 16/1873 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

(56) References Cited

OTHER PUBLICATIONS

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

\* cited by examiner

DATA RECONSTRUCTION IN A STORAGE NETWORK AND METHODS FOR USE THEREWITH

CROSS-REFERENCE TO RELATED APPLICATIONS

The present U.S. Utility Patent application claims priority pursuant to 35 U.S.C. § 120 as a continuation of U.S. Utility application Ser. No. 17/645,563, entitled "Reconstructing Data Segments in a Storage Network and Methods for use Therewith", filed Dec. 22, 2021, which is a continuation-in-part of U.S. Utility application Ser. No. 16/149,667, entitled "Utilizing Concentric Storage Pools in a Dispersed Storage Network,", filed Oct. 2, 2018, which is a continuation-in-part of U.S. Utility application Ser. No. 15/819,810, entitled "Storage Vault Tiering and Data Migration in a Distributed Storage Network," filed Nov. 21, 2017, issued as U.S. Pat. No. 11,327,674 on May 10, 2022, which is a continuation-in-part of U.S. Utility application Ser. No. 13/869,655, entitled "Updating Access Control Information within a Dispersed Storage Unit," filed Apr. 24, 2013, issued as U.S. Pat. No. 10,178,083 on Jan. 8, 2019, which claims priority pursuant to 35 U.S.C. § 119 (c) to U.S. Provisional Application No. 61/655,736, entitled "Storing Data in a Layered Distributed Storage and Task Network", filed Jun. 5, 2012, all of which are hereby incorporated herein by reference in their entirety and made part of the present U.S. Utility Patent Application for all purposes.

U.S. Utility application Ser. No. 17/645,563 also claims priority pursuant to 35 U.S.C. § 120 as a continuation-in-part of U.S. Utility application Ser. No. 16/988,135, entitled "Validating Requests Based on Stored Vault Information", filed Aug. 7, 2020, issued as U.S. Pat. No. 11,416,339 on Aug. 16, 2022, which is a continuation of U.S. Utility application Ser. No. 16/390,530, entitled "Digest Listing Decomposition", filed Apr. 22, 2019, issued as U.S. Pat. No. 11,194,662 on Dec. 7, 2021, which is a continuation of U.S. Utility application Ser. No. 14/447,890, entitled "Digest Listing Decomposition", filed Jul. 31, 2014, issued as U.S. Pat. No. 10,360,180 on Jul. 23, 2019, which is a continuation of U.S. Utility application Ser. No. 13/154,725, entitled, "Metadata Access In A Dispersed Storage Network", filed Jun. 7, 2011, issued as U.S. Pat. No. 10,289,688 on May 14, 2019, which claims priority pursuant to 35 U.S.C. § 119 (c) to U.S. Provisional Application No. 61/357,430, entitled "Dispersal Method In A Dispersed Storage System", filed Jun. 22, 2010, all of which are hereby incorporated herein by reference in their entirety and made part of the present U.S. Utility Patent Application for all purposes.

U.S. Utility application Ser. No. 14/447,890 also claims priority pursuant to 35 U.S.C. § 120 as a continuation-in-part of U.S. Utility application Ser. No. 12/749,592, entitled "Dispersed Storage Processing Unit And Methods With Data Aggregation For Use In A Dispersed Storage System", filed Mar. 30, 2010, issued as U.S. Pat. No. 8,938,591 on Jan. 20, 2015, which claims priority pursuant to 35 U.S.C. § 119 (e) to U.S. Provisional Application No. 61/237,624, entitled "Dispersed Storage Unit And Methods With Metadata Separation For Use In A Dispersed Storage System", filed Aug. 27, 2009, all of which are hereby incorporated herein by reference in their entirety and made part of the present U.S. Utility Patent Application for all purposes.

U.S. Utility application Ser. No. 12/749,592 also claims priority pursuant to 35 U.S.C. § 120 as a continuation-in-part of U.S. Utility application Ser. No. 12/218,594, entitled "Streaming Media Software Interface To A Dispersed Data Storage Network", filed Jul. 16, 2008, issued as U.S. Pat. No. 7,962,641 on Jun. 14, 2011, which claims priority pursuant to 35 U.S.C. § 120 as a continuation-in-part of:

1. U.S. Utility application Ser. No. 11/973,613, entitled "Block Based Access To A Dispersed Data Storage Network", filed Oct. 9, 2007, issued as U.S. Pat. No. 8,285,878 on Oct. 9, 2012;
2. U.S. Utility application Ser. No. 11/973,622, entitled "Smart Access To A Dispersed Data Storage Network", filed Oct. 9, 2007, issued as U.S. Pat. No. 8,171,101 on May 1, 2012;
3. U.S. Utility application Ser. No. 11/973,542, entitled "Ensuring Data Integrity On A Dispersed Storage Network", filed Oct. 9, 2007, issued as U.S. Pat. No. 9,996,413 on Jun. 12, 2018;
4. U.S. Utility application Ser. No. 11/973,621, entitled "Virtualized Storage Vaults On A Dispersed Data Storage Network", filed Oct. 9, 2007, issued as U.S. Pat. No. 7,904,475 on Mar. 8, 2011;
5. U.S. Utility application Ser. No. 11/241,555, entitled "System, Methods, And Apparatus For Subdividing Data For Storage In A Dispersed Data Storage Grid", filed Sep. 30, 2005, issued as U.S. Pat. No. 7,953,937 on May 31, 2011;
6. U.S. Utility application Ser. No. 11/403,684, entitled "Billing System For Information Dispersal System", filed Apr. 13, 2006, issued as U.S. Pat. No. 7,574,570 on Aug. 11, 2009;
7. U.S. Utility application Ser. No. 11/404,071, entitled "Metadata Management System For An Information Dispersed Storage System", filed Apr. 13, 2006, issued as U.S. Pat. No. 7,574,579 on Aug. 11, 2009;
8. U.S. Utility application Ser. No. 11/403,391, entitled "System For Rebuilding Dispersed Data", filed Apr. 13, 2006, issued as U.S. Pat. No. 7,546,427 on Jun. 9, 2009;
9. U.S. Utility application Ser. No. 12/080,042, entitled "Rebuilding Data On A Dispersed Storage Network", filed Mar. 31, 2008, issued as U.S. Pat. No. 8,880,799 on Nov. 4, 2014, and
10. U.S. Utility application Ser. No. 12/218,200, entitled "File System Adapted For Use With A Dispersed Data Storage Network", filed Jul. 14, 2008, issued as U.S. Pat. No. 8,209,363 on Jun. 26, 2012;

All of the above are hereby incorporated herein by reference in their entirety and made part of the present U.S. Utility Patent Application for all purposes.

In addition, U.S. Utility application Ser. No. 16/988,135 is related to the following U.S. patent applications that are commonly owned:

1. "Dispersed Storage Unit And Methods With Metadata Separation For Use In A Dispersed Storage System", application Ser. No. 12/749,583, filed on Mar. 30, 2010, issued as U.S. Pat. No. 9,235,350 on Jan. 12, 2016.
2. "Dispersed Storage Processing Unit And Methods With Operating System Diversity For Use In A Dispersed Storage System", application Ser. No. 12/749,606, filed on Mar. 30, 2010, issued as U.S. Pat. No. 9,690,513 on Jun. 27, 2017.
3. "Dispersed Storage Processing Unit And Methods With Geographical Diversity For Use In A Dispersed Storage System", application Ser. No. 12/749,625, and filed on Mar. 30, 2010, issued as U.S. Pat. No. 9,772,791 on Sep. 26, 2017.

All of the above are hereby incorporated herein by reference in their entirety and made part of the present U.S. Utility Patent Application for all purposes.

FIELD OF THE DISCLOSURE

The present disclosure relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for ensuring data integrity on a dispersed data storage network.

BRIEF DESCRIPTION OF THE DRAWINGS

Although the characteristic features of this disclosure will be particularly pointed out in the claims, and the disclosure itself—the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EXAMPLES

Figure 1:
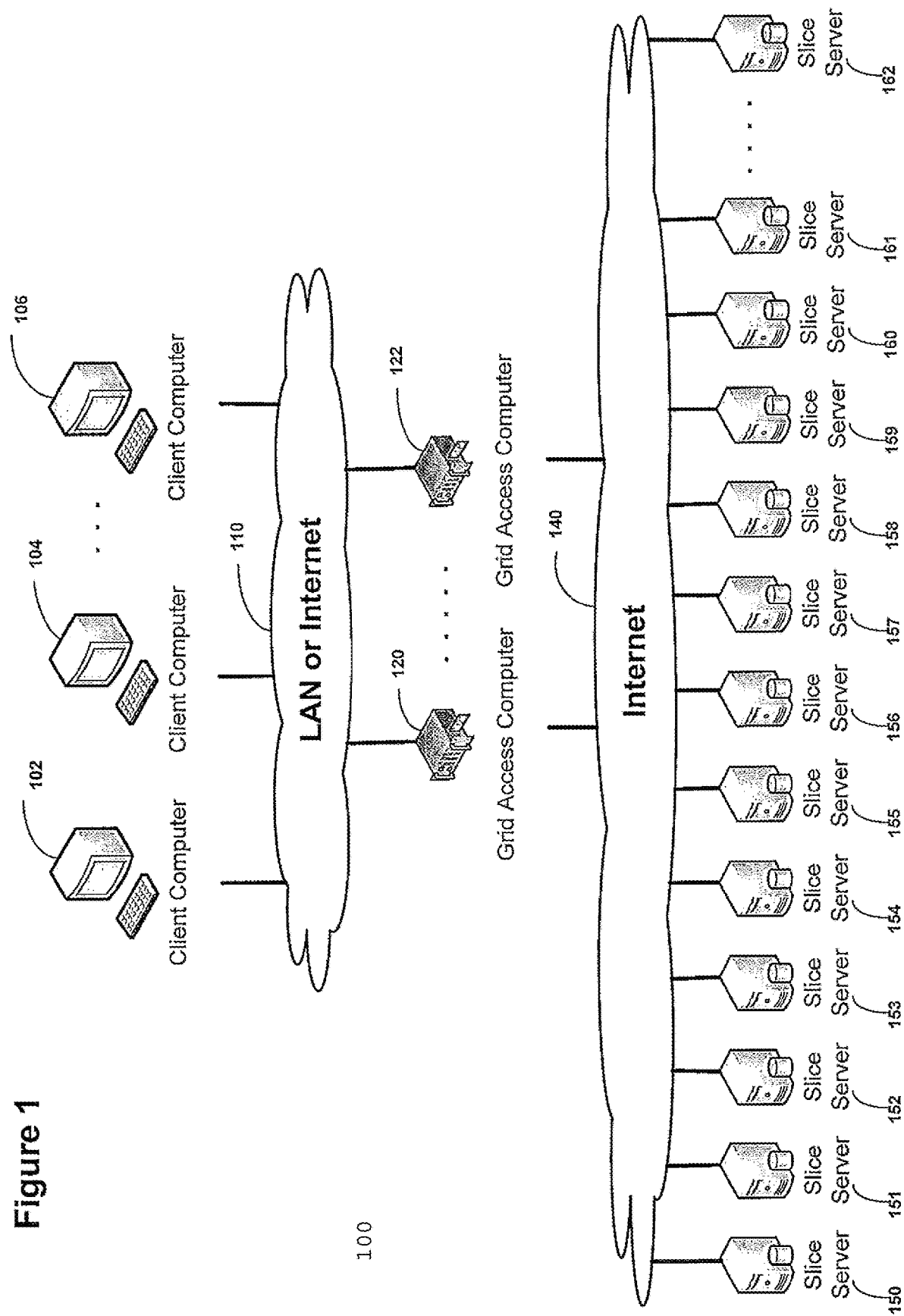
FIG. 1 is a network diagram of a dispersed data storage network constructed in accordance with an example of the disclosed disclosure.

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in her home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple units, referred to as "stripes," each of which is stored on a separate drive. Data striping is performed in an algorithmically certain way so that the data can be reconstructed. While certain RAID configurations can improve reliability, RAID does nothing to address security concerns associated with digital data storage.

Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

Digitally stored data is subject to degradation over time, although such degradation tends to be extremely minor and the time periods involved tend to be much longer than for analog data storage. Nonetheless, if a single bit within a file comprised of millions of bits changes from a zero to a one or vice versa, the integrity of the file has been compromised, and its usability becomes suspect. Further, errors occur more frequently when digital data is transmitted due to noise in the transmission medium. Various prior art techniques have been devised to detect when a digital data segment has been compromised. One early form of error detection is known as parity, wherein a single bit is appended to each transmitted byte or word of data. The parity bit is set so that the total number of one bits in the transmitted byte or word is either even or odd. The receiving processor then checks the received byte or word for the appropriate parity, and, if it is incorrect, asks that the byte or word be resent.

Another form of error detection is the use of a checksum. There are many different types of checksums including classic checksums, cryptographic hash functions, digital signatures, cyclic redundancy checks, and the use of human readable "check digits" by the postal service and libraries. All of these techniques involve performing a mathematical calculation over an entire data segment to arrive at a checksum, which is appended to the data segment. For stored data, the checksum for the data segment can be recalculated periodically, and checked against the previously calculated checksum appended to the data segment. For transmitted data, the checksum is calculated by the transmitter and appended to the data segment. The receiver then recalculates the checksum for the received data segment, and if it does not match the checksum appended to the data segment, requests that it be retransmitted.

In 1979, two researchers independently developed a method for splitting data among multiple recipients called "secret sharing." One of the characteristics of secret sharing is that a piece of data may be split among n recipients, but cannot be known unless at least t recipients share their data, where n.gtoreq.t. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s' = s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-oring all four bytes together.

The problem of reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank.

While dispersed data storage networks (DDSN's) can theoretically be implemented to provide any desired level of reliability, practical considerations tend to make this impossible in prior art solutions. For example, DDSNs rely on storage media to store data slices. This storage media, like all storage media, will degrade over time. Furthermore, DDSN's rely on numerous transmissions to physically disparate slice servers, and data slices may become corrupted during transmissions. While TCP utilizes a CRC in every transmitted packet, the reliability provided by this CRC is not sufficient for critical data storage.

The disclosed disclosure achieves its objectives by providing an improved method for insuring the integrity of data stored on a dispersed data storage network. A checksum is calculated for a data segment to be written to a DDSN. The checksum is appended to the data segment, which is sliced into a plurality of data slices. A second set of checksums is calculated for and appended to the different data slices, which are then transmitted to different slice servers. For each receiving slice server, a checksum is calculated for the received data slice, and compared to the checksum appended to the received data slice. If the checksums vary, the receiving slice server marks the data slice as corrupted, and requests that the corrupted data slice be resent.

In another aspect of the disclosed disclosure, a distributed computer system implements a dispersed data storage network. In this system, a rebuilder application periodically recalculates checksums for data slices stored on a plurality of slice servers. Where the calculated checksum does not match the checksum appended to a stored data slice, the data slice is marked as corrupted. The rebuilder application then identifies the stored data segment associated with the corrupted data slice, and issues read requests to other slice servers holding data slices corresponding to the identified data segment. The data segment is rebuilt and re-sliced, and any slice servers containing corrupted data are sent new data slices to replace the corrupted data slices.

Turning to the Figures, and to FIG. 1 in particular, a distributed computer system implementing a dispersed data storage grid 100 is shown. An arbitrary number of slice servers 150-162 store data slices sent to them by networked source computers 102, 104, 106. As illustrated, some number of grid access computers 120, 122 allows access to the slice servers 150-162 by the source computers 102, 104, 106.

As explained herein, the disclosed disclosure works to ensure integrity of data stored in a DDSN not only by using checksums on each stored data segment as well as the constituent data slices, but also by reconstructing corrupted data slices as well. In accordance with the disclosed disclosure, grid access computers 120, 122 will calculate a checksum for each data segment to be stored, and append the checksum to the data segment prior to slicing. The data segment is then sliced in accordance with an information dispersal algorithm, and checksums are calculated and appended to each of the data slices. The data slices are then forwarded to slice servers 150-162, where the data slices are stored.

In addition, grid access computers 120, 122 also recreate data slices that have become corrupted, or were destroyed. If during operation of the DDSN 100, it is detected that a particular data slice has been corrupted or destroyed, a different data slice will be requested from a different slice server 150-162. Assuming that sufficient non-corrupted data slices exist to successfully reconstruct the original data segment, the reconstructed data segment will be re-sliced, and the corrupted data slice will be replaced with a non-corrupted version. Further, a rebuilder application operating within the DDSN periodically walks through all data slices stored on the DDSN. When a corrupted data slice is found, the rebuilder application identifies the data segment corresponding to the corrupted data slice, rebuilds the identified data segment, and rewrites the corrupted slice.

Figure 2:
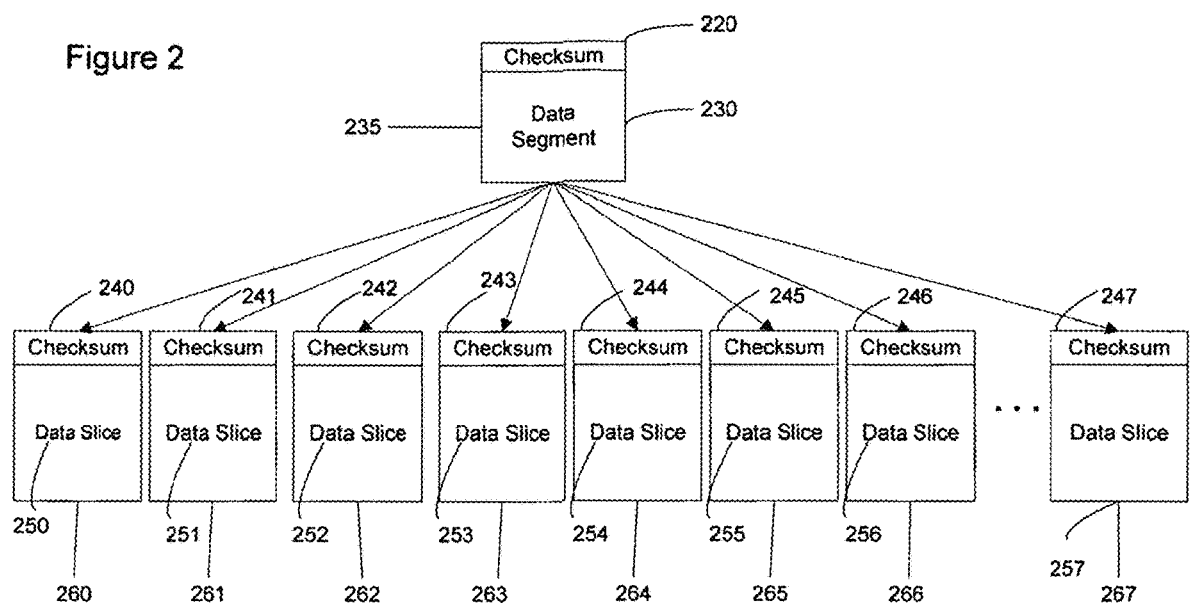
FIG. 2 illustrates the use of checksums on a data segment as well as on an arbitrary number of data slices created from the data segment.

FIG. 2 depicts the use of a checksum 220 on a data segment 230, as well as on the data slices 250-257 that the data segment 230 was divided into. Assuming that a data segment 230 is being written to a DDSN, a checksum 220 will be calculated for and appended to the data segment 230, thereby forming a "certified data segment." The certified data segment 230 will then be sliced as one piece of data resulting in data slices 250-257, i.e., when the data slices 250-257 are recombined, both the data segment 230 and data segment checksum 220 will be recovered. A checksum 240-247 is then calculated for, and appended to each data slice 250-257, forming "certified data slices" 260-267. The certified data slices 260-267 will then be sent to different slice servers.

Figure 3:
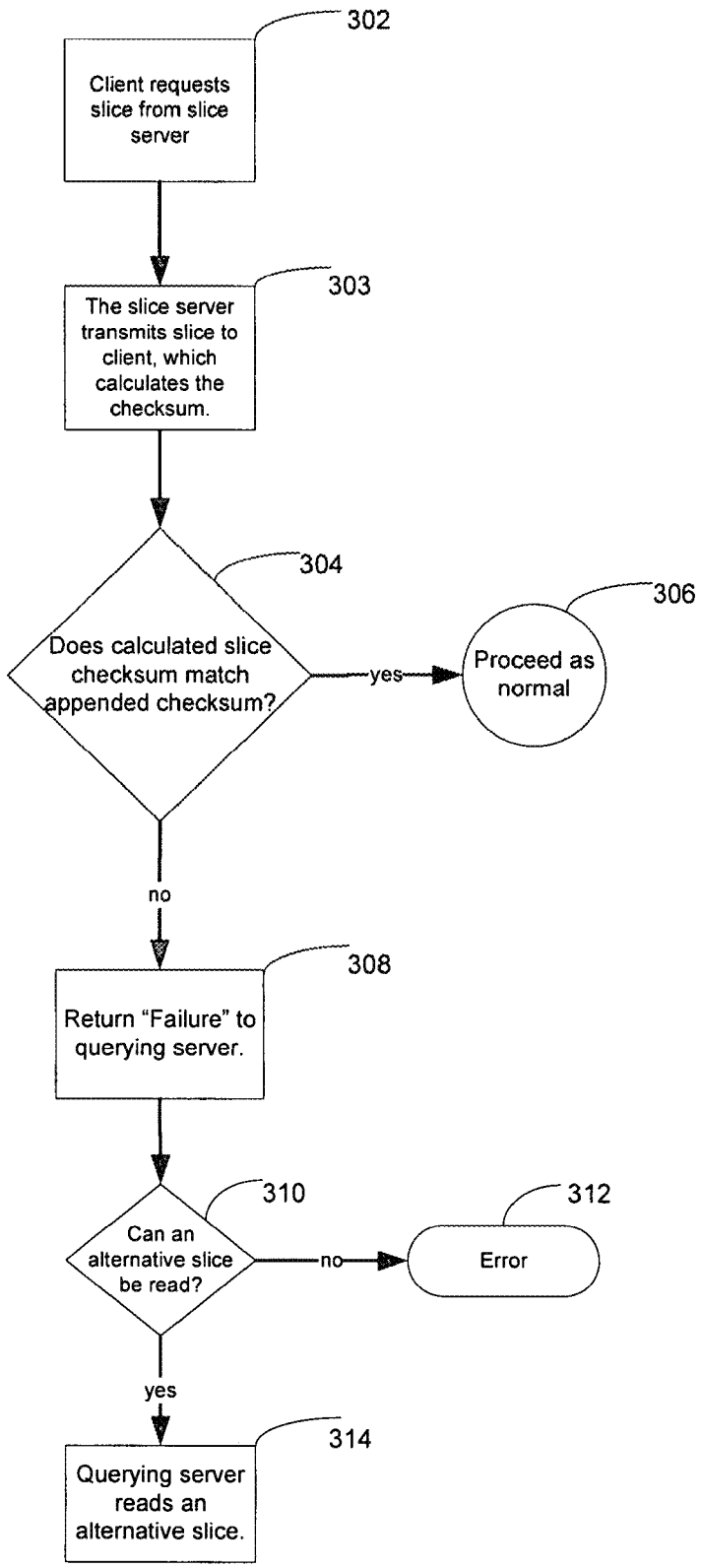
FIG. 3 is a flowchart illustrating the process by which a corrupted data segment can be rebuilt by a dispersed data storage network constructed in accordance with an example of the disclosed disclosure.

FIG. 3 depicts one possible process by which corrupted slices may be recreated. During a read operation of the DDSN, a client requests a slice from a slice server in step 302. In step 303, the slice server transmits the requested slice to the client, which calculates a checksum for the requested data slice. In step 304, the calculated checksum is compared to the checksum appended to the stored data slice, and if the two checksums match, the read proceeds as normal in step 306. However, if the two checksums do not match, the slice server will transmit a message to a rebuilder application operating on the DDSN indicating that the requested data slice is corrupted in step 308, and return "Failure" to the querying server. The corrupted slice may be rewritten asynchronously as discussed in the text addressing FIG. 6. In step 310, the querying server determines if an alternative slice can be read from a different slice server. If an alternative slice does not exist, the querying server will report an error in step 312. In step 314, the querying computer reads the alternative slice.

Figure 4A:
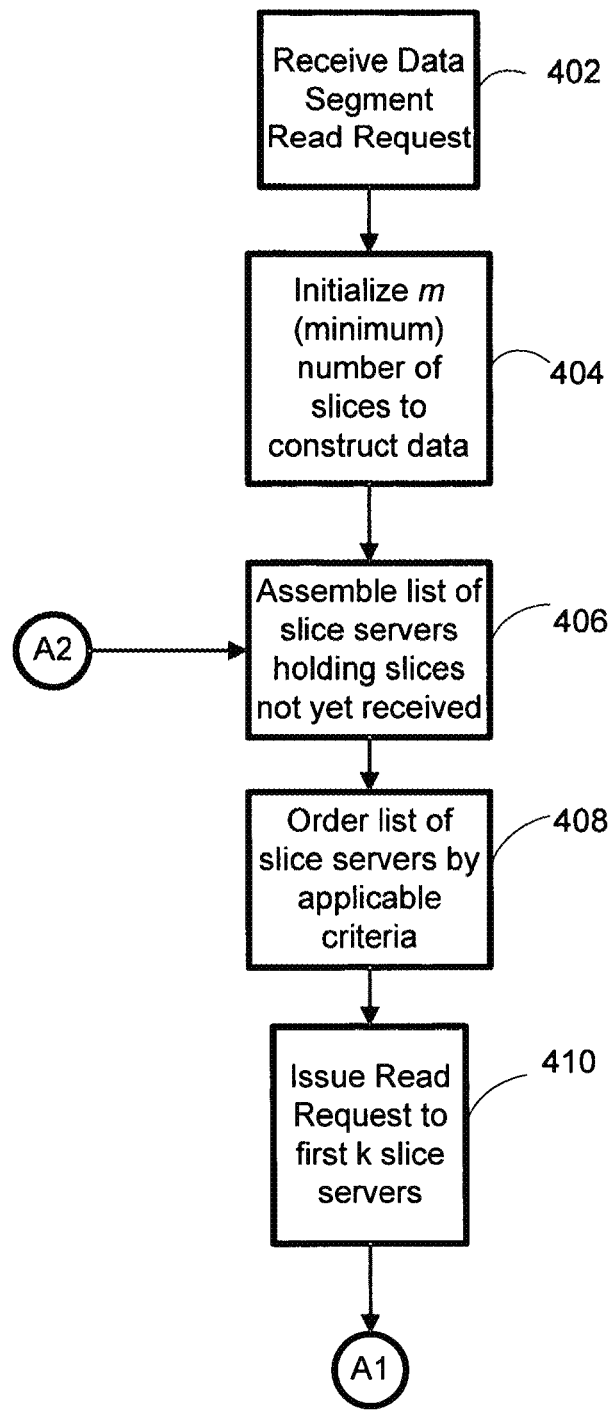
FIGS. 4A-4C collectively illustrates a read operation from a dispersed data storage network constructed in accordance with an example of the disclosed disclosure.
Figure 4B:
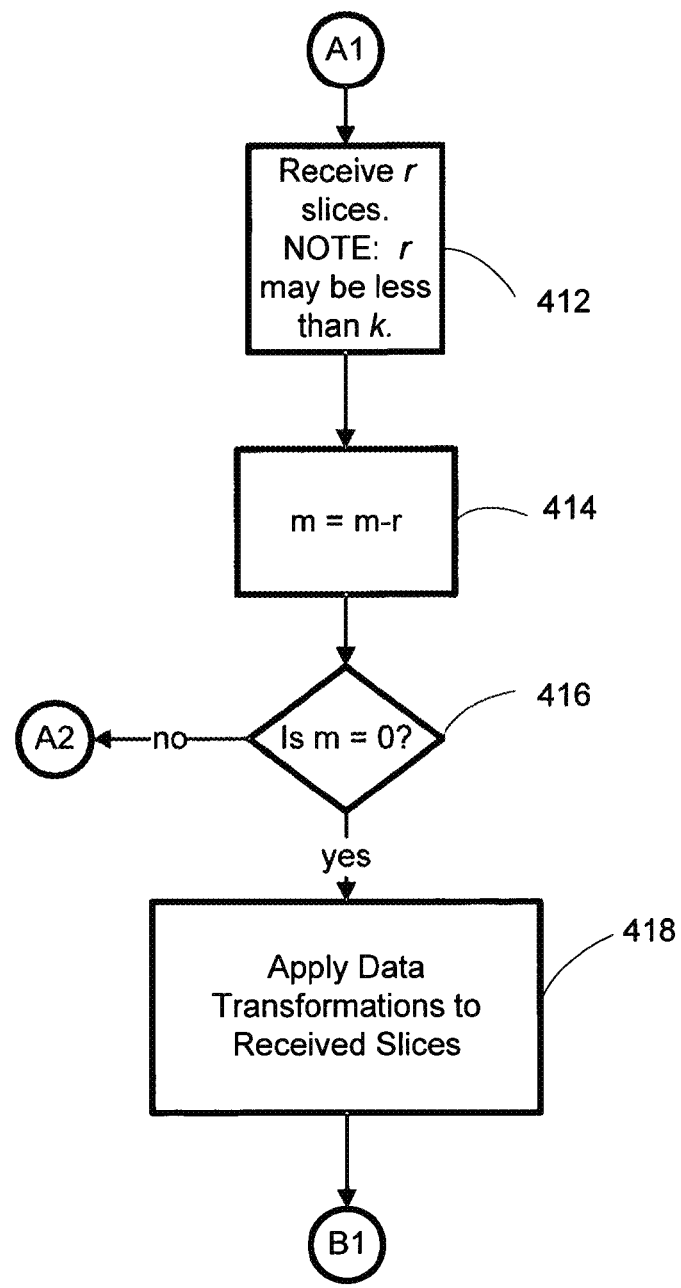
Figure 4C:
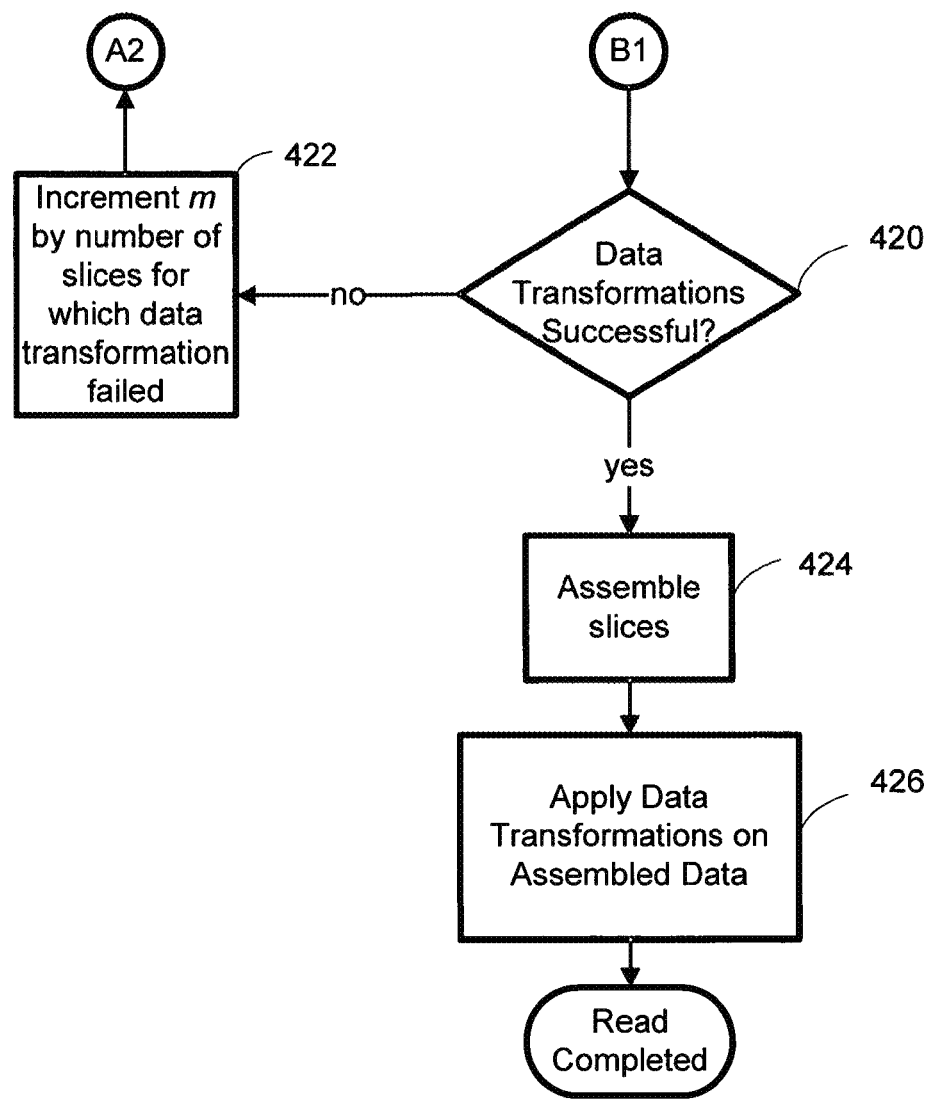

FIGS. 4A-4C show the process by which a DDSN, constructed in accordance with the disclosed disclosure and used in conjunction with the with the process depicted in FIG. 3, could fulfill a read request. In step 402, a read request is received. Contained within the read request will be information sufficient to determine which slice servers contain applicable data, as well as the minimum number of data slices that must be retrieved before the requested data can be reconstructed. Further information on one method that can be used to associate data requests with particular slice servers is contained in U.S. patent application Ser. No. 11/973,621, titled "VIRTUALIZED DATA STORAGE VAULTS ON A DISPERSED DATA STORAGE NETWORK," filed on Oct. 9, 2007 and assigned to Pure Storage, Inc. In step 404, the variable m is initialized to the minimum number of slices required to construct the requested data segment. As described herein, for each successfully received and validated slice, m is decremented.

In step 406, a list of slice servers each holding a required data slice that has yet to be received is assembled, and in step 408, the list is ordered by any applicable criteria. Further information on criteria by which the list may be ordered is contained in U.S. patent application Ser. No. 11/973,622, titled "SMART ACCESS TO A DISPERSED DATA STORAGE NETWORK," filed on Oct. 9, 2007 and assigned to Pure Storage, Inc. In step 410, read requests are issued to the first k slice servers on the assembled list, where k is at least equal to m, the minimum number of data slices needed to reconstruct the requested data segment, but could be as large as n, the number of data slices that have data relevant to the requested data segment. In step 412, r data slices are received, and in step 414 the number of received data slices r is subtracted from the variable m. In step 416, m is compared to zero, and if m is greater than or equal to zero, execution returns to step 406 and proceeds as normal from there. However, if m is equal to zero, a collection of data transformations may optionally be applied to the received slices in step 418. The applied data transformations can include decryption, decompression, and integrity checking. In accordance with the disclosed disclosure, each data slice includes a cyclical redundancy check ("CRC"), or other form of checksum appended to the data contained in the slice. This checksum will be compared against a checksum calculated by the receiving slice server against the received data to ensure that the data was not corrupted during the transmission process.

In step 420, it is determined if the applied data transformations were successful for all of the received data slices. If the applied data transformations were not successful for some of the received slices, m is incremented by this number in step 422, and execution is resumed at step 406. The data transformations could fail, for example, if an integrity check revealed that a received data slice was corrupted. However, if the applied data transformations were successful for all received data slices, the received slices are assembled into the requested block of data in step 424. The same or different data transformations may optionally be applied to the assembled data block in step 426, which completes the read process. In accordance with the disclosed disclosure, a checksum for the data segment will be calculated and compared to a checksum appended to the assembled data segment.

Figure 5A:
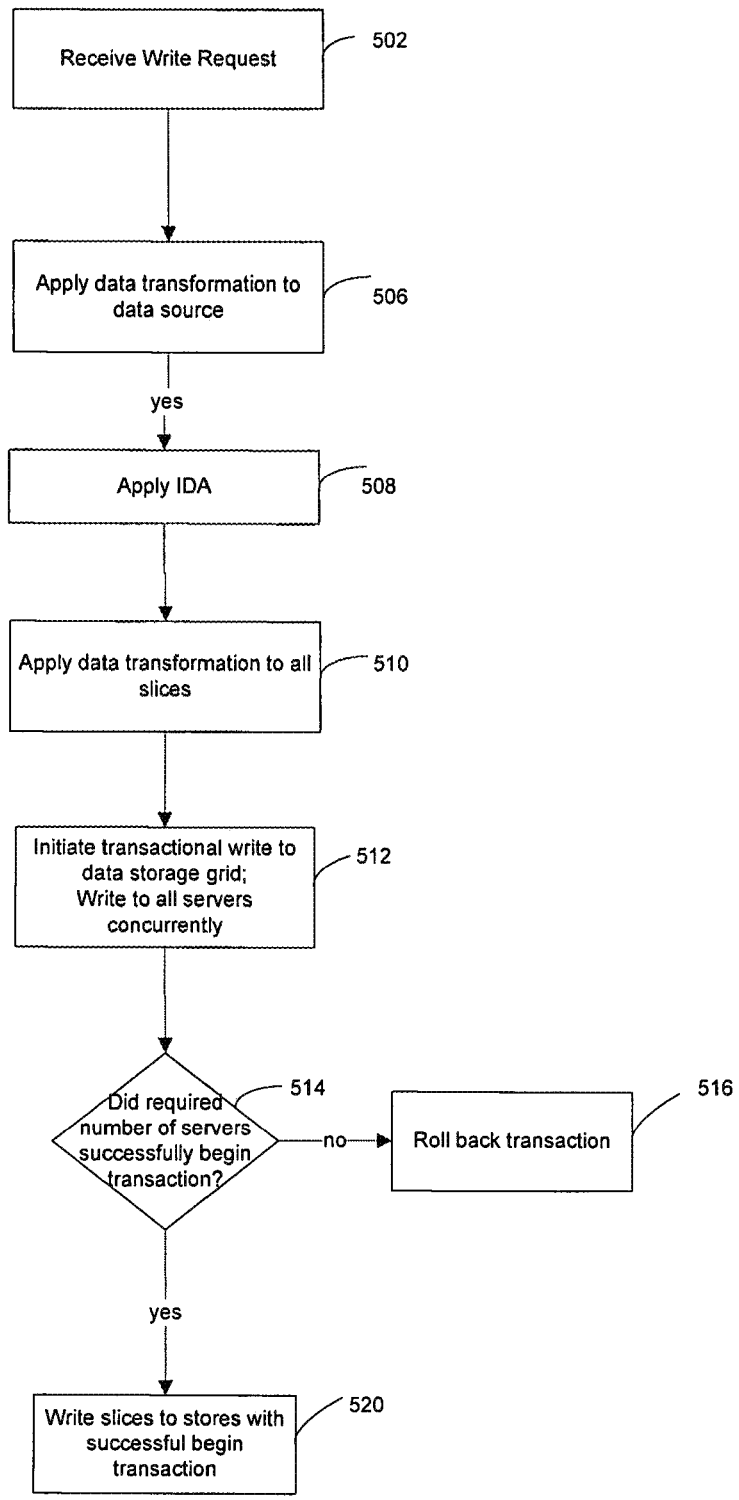
FIGS. 5A-5B collectively illustrates a write operation from a dispersed data storage network constructed in accordance with an example of the disclosed disclosure.
Figure 5B:
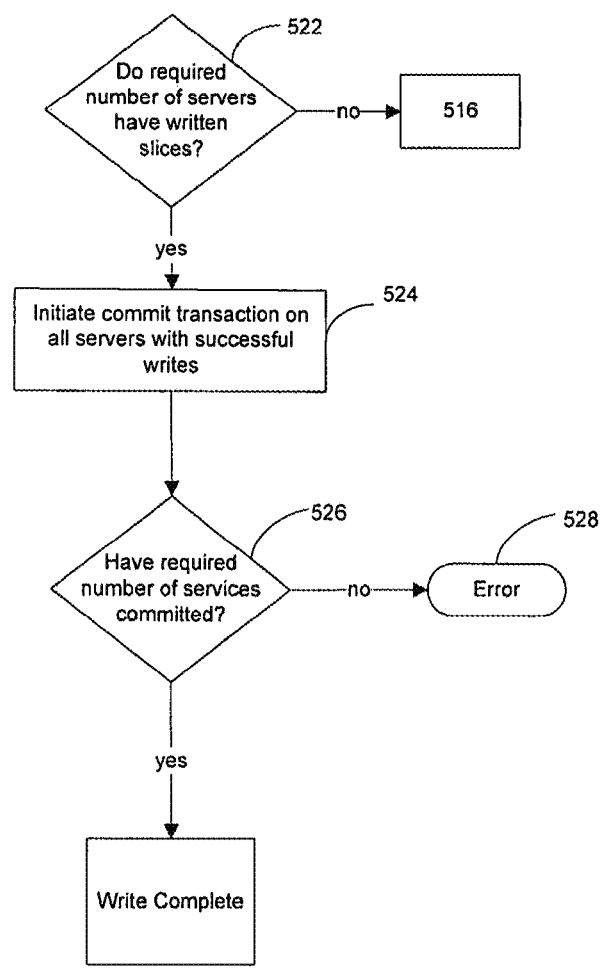

In FIGS. 5A-5B the process by which a DDSN, constructed in accordance with the disclosed disclosure, could write data to a network of slice servers is illustrated. In step 502 a data segment write request is received. Included in this write request is information sufficient to determine which slice servers the data segment should be written to, as well as information required by the information dispersal algorithm to divide the data segment, i.e., the number of slices to be written, referred to as n, as well as the minimum number of slices that are required to recover the data, referred to as m. Further information on one method that can be used to associate data writes with particular slice servers is contained in U.S. patent application Ser. No. 11/973,621, titled "VIRTUALIZED DATA STORAGE VAULTS ON A DISPERSED DATA STORAGE NETWORK," filed on Oct. 9, 2007 and assigned to Pure Storage, Inc.

A number of data transformations may optionally be applied to each block in step 506, and an information dispersal algorithm is applied in step 508. In particular, the Cauchy Reed-Solomon dispersal algorithm could be applied to the data segment, resulting in a predetermined number of data slices. In step 510, a number of data transformations are optionally applied to each data slice.

In the disclosed system, writes are performed transactionally, meaning that a minimum number of data slices t must be successfully written before a write is deemed complete. Normally, the number of data slices that must be successfully written will be set to n, i.e., the number of slices that the data segment was originally divided into. However, this number can be configured by the user to a lesser number, down to the minimum number of slices required to reconstruct the data. This would allow the user to continue using the DDSN during a minor network outage where one or more slice servers were unavailable. Slices that could not be immediately transmitted and stored could be queued and transmitted when the network outage cleared. In step 512, a write transaction is initiated to the data storage grid. As discussed herein, all slice servers are simultaneously contacted, and in step 514, a confirmation that at least t receiving slice servers are prepared to begin the write transaction, i.e., to store each slice, must be received, or the transaction is rolled back in step 516.

In step 520 data slices are transmitted to the slice servers that indicated their ability to receive and store slices. The number of slice servers that successfully received and stored their assigned data slices is checked in step 522, and if less than t slices are successfully stored, the transaction is rolled back in step 516. In step 524, a commit transaction is begun on all servers with successful writes. If the commit transaction fails, an error is logged in step 528. Otherwise, the write transaction was successful.

Figure 6A:
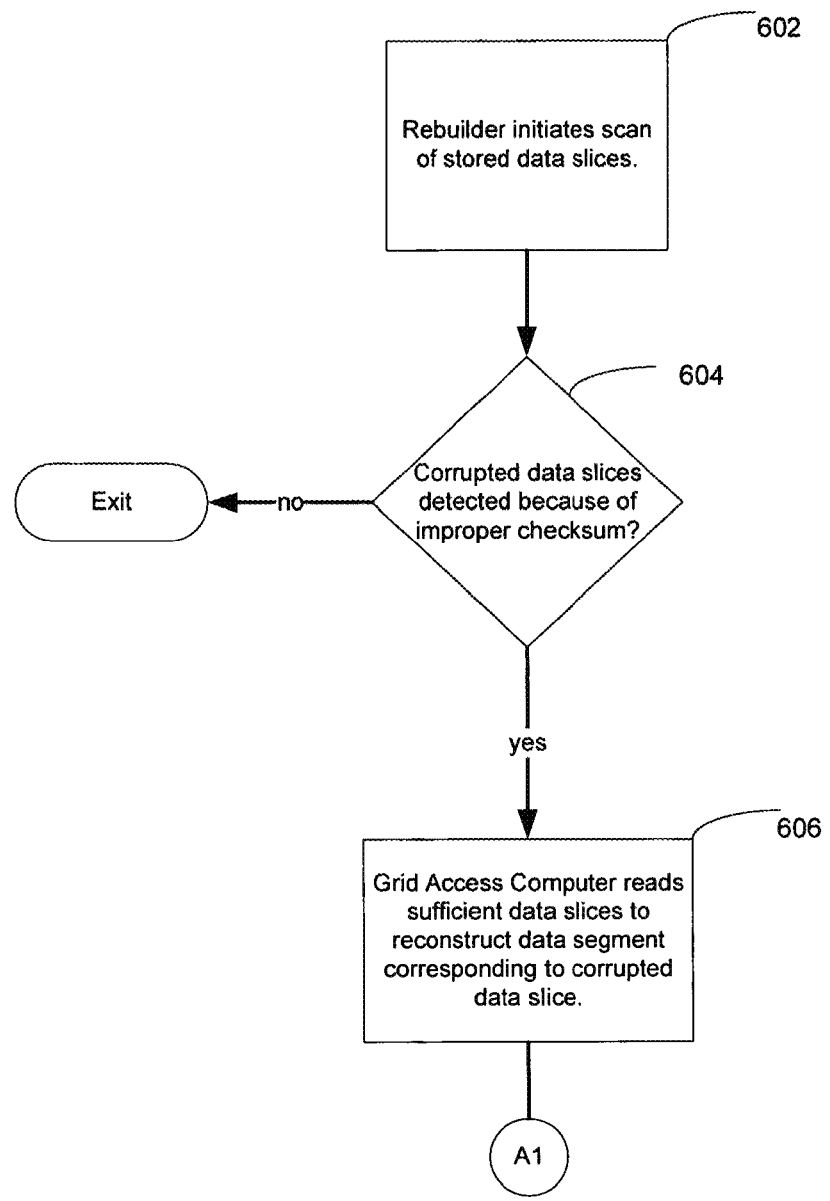
FIGS. 6A-6B collectively illustrates an alternative process by which corrupted data slices may be recreated.
Figure 6B:
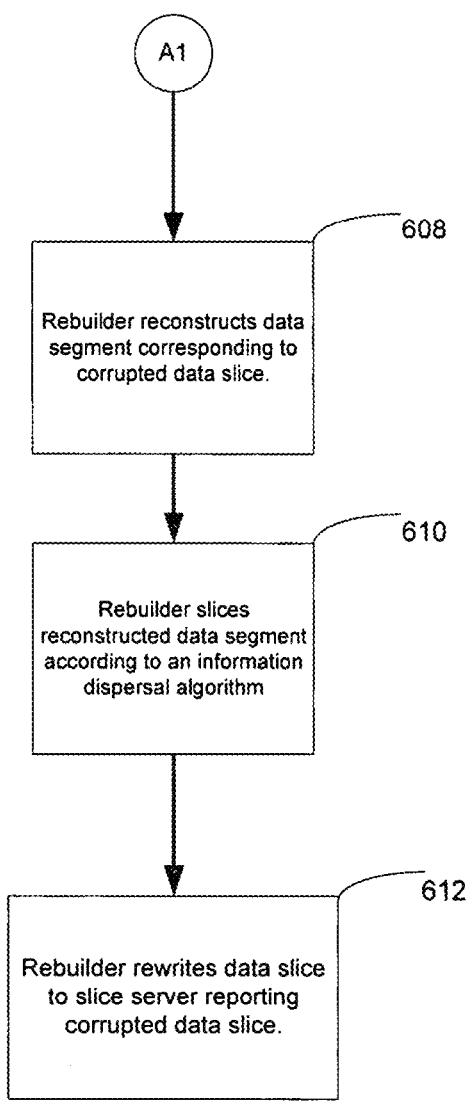

FIGS. 6A-6B are a flow chart illustrating an alternative process by which corrupted data slices may be recreated. In step 602, a scan of data slices is initiated by a rebuilder application operating somewhere on the DDSN. If no corrupted data slice is found, the corrupted slice recreation process is exited in step 605. However, if a corrupted slice is detected because of a failed integrity check, execution proceeds to step 606, where a grid access computer determines what data segment corresponds to the corrupted data slice, and reads that data segment from the DDSN. The grid access computer then reconstructs the data segment in step 608. In step 610, the data segment is re-sliced, and the grid access computer rewrites a non-corrupted version of the corrupted data slice to the appropriate slice server in step 612.

The foregoing description of the disclosure has been presented for purposes of illustration and description, and is not intended to be exhaustive or to limit the disclosure to the precise form disclosed. The description was selected to best explain the principles of the disclosure and practical application of these principles to enable others skilled in the art to best utilize the disclosure in various examples and various modifications as are suited to the particular use contemplated. It is intended that the scope of the disclosure not be limited by the specification, but be defined by the claims set forth below.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition-requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
   receiving an access request for a data segment, wherein the data segment is encoded utilizing an error correcting information dispersal algorithm as a set of encoded data slices that are stored in a plurality of storage units of a storage network and wherein each encoded data slice of the set of encoded data slices includes a corresponding checksum of a plurality of checksums;
   retrieving, from the storage network, a subset of encoded data slices that includes at least a threshold number of encoded data slices of the set of encoded data slices;
   determining, based on ones of the plurality of checksums corresponding to the subset of encoded data slices, when the subset of encoded data slices includes at least one corrupted encoded data slice;
   retrieving from at least one of the plurality of storage units an additional number of encoded data slices when required to generate a reconstructed data segment based on the subset of encoded data slices;
   generating the reconstructed data segment in accordance with the error correcting information dispersal algorithm, using the additional number of encoded data slices and at least some of the subset of encoded data slices;
   providing the reconstructed data segment in response to the access request;
   forming at least one reconstructed encoded data slice utilizing the error correcting information dispersal algorithm on the reconstructed data segment; and
   replacing the at least one corrupted encoded data slice with the at least one reconstructed encoded data slice.

2. The method of claim 1, wherein the threshold number of encoded data slices corresponds to a minimum number of the set of encoded data slices required to reconstruct the data segment.

3. The method of claim 1, wherein the error correcting information dispersal algorithm is a Cauchy-Reed-Solomon coding.

4. The method of claim 1, wherein the error correcting information dispersal algorithm is an erasure coding.

5. The method of claim 1, further comprising:
   determining, based on ones of the plurality of checksums corresponding to the subset of encoded data slices, when the subset of encoded data slices does not include a corrupted encoded data slice;
   decoding the threshold number of encoded data slices to recover the data segment;
   verifying accuracy of the recovered data segment; and
   when the accuracy of the recovered data segment has been verified, providing the recovered data segment in response to the access request.

6. The method of claim 1, wherein a first of the plurality of storage units is remotely located from a second of the plurality of storage units within the storage network.

7. The method of claim 1, wherein the plurality of checksums are based on a cyclic redundancy check.

8. A computer comprising:
   a port configured to support communications with a storage network;
   an application, coupled to the port, that is configured to enable a computer to perform operations that include:
     receiving an access request for a data segment, wherein the data segment is encoded utilizing an error correcting information dispersal algorithm as a set of encoded data slices that are stored in a plurality of storage units of a storage network and wherein each encoded data slice of the set of encoded data slices includes a corresponding checksum of a plurality of checksums;
     retrieving, from the storage network, a subset of encoded data slices that includes at least a threshold number of encoded data slices of the set of encoded data slices;
     determining, based on ones of the plurality of checksums corresponding to the subset of encoded data slices, when the subset of encoded data slices includes at least one corrupted encoded data slice;
     retrieving from at least one of the plurality of storage units an additional number of encoded data slices when required to generate a reconstructed data segment based on the subset of encoded data slices;
     generating the reconstructed data segment in accordance with the error correcting information dispersal algorithm, using the additional number of encoded data slices and at least some of the subset of encoded data slices;
     providing the reconstructed data segment in response to the access request;
     forming at least one reconstructed encoded data slice utilizing the error correcting information dispersal algorithm on the reconstructed data segment; and replacing the at least one corrupted encoded data slice with the at least one reconstructed encoded data slice.

9. The computer of claim 8, wherein the error correcting information dispersal algorithm is a Reed-Solomon coding.

10. The computer of claim 8, wherein the error correcting information dispersal algorithm is a Cauchy-Reed-Solomon coding.

11. The computer of claim 8, wherein the error correcting information dispersal algorithm is an erasure coding.

12. The computer of claim 8, wherein the operations further comprise:
   determining, based on ones of the plurality of checksums corresponding to the subset of encoded data slices, when the subset of encoded data slices does not include a corrupted encoded data slice;
   decoding the threshold number of encoded data slices to recover the data segment;
   verifying accuracy of the recovered data segment; and
   when the accuracy of the recovered data segment has been verified, providing the recovered data segment in response to the access request.

13. The computer of claim 8, wherein a first of the plurality of storage units is remotely located from a second of the plurality of storage units within the storage network.

14. The computer of claim 8, wherein the plurality of checksums are based on a cyclic redundancy check.

15. A non-transitory computer readable storage medium comprises:
   at least one memory section that stores operational instructions that, when executed by a processing system of a storage network that includes a processor and a memory, causes the processing system to perform operations that include:
      receiving an access request for a data segment, wherein the data segment is encoded utilizing an error correcting information dispersal algorithm as a set of encoded data slices that are stored in a plurality of storage units of a storage network and wherein each encoded data slice of the set of encoded data slices includes a corresponding checksum of a plurality of checksums;
      retrieving, from the storage network, a subset of encoded data slices that includes at least a threshold number of encoded data slices of the set of encoded data slices;
      determining, based on ones of the plurality of checksums corresponding to the subset of encoded data slices, when the subset of encoded data slices includes at least one corrupted encoded data slice;
      retrieving from at least one of the plurality of storage units an additional number of encoded data slices when required to generate a reconstructed data segment based on the subset of encoded data slices;
      generating the reconstructed data segment in accordance with the error correcting information dispersal algorithm, using the additional number of encoded data slices and at least some of the subset of encoded data slices;
      providing the reconstructed data segment in response to the access request;
      forming at least one reconstructed encoded data slice utilizing the error correcting information dispersal algorithm on the reconstructed data segment; and
      replacing the at least one corrupted encoded data slice with the at least one reconstructed encoded data slice.

16. The non-transitory computer readable storage medium of claim 15, wherein the error correcting information dispersal algorithm is a Reed-Solomon coding.

17. The non-transitory computer readable storage medium of claim 15, wherein the error correcting information dispersal algorithm is a Cauchy-Reed-Solomon coding.

18. The non-transitory computer readable storage medium of claim 15, wherein the error correcting information dispersal algorithm is an erasure coding.

19. The non-transitory computer readable storage medium of claim 15, wherein the operations further comprise:
   determining, based on ones of the plurality of checksums corresponding to the subset of encoded data slices, when the subset of encoded data slices does not include a corrupted encoded data slice;
   decoding the threshold number of encoded data slices to recover the data segment;
   verifying accuracy of the recovered data segment; and
   when the accuracy of the recovered data segment has been verified, providing the recovered data segment in response to the access request.

20. The non-transitory computer readable storage medium of claim 15, wherein a first of the plurality of storage units is remotely located from a second of the plurality of storage units within the storage network.

* * * * *